May 15, 1956     W. E. BURTON     2,745,139
METHOD AND APPARATUS FOR PRODUCING MOLDABLE
RUBBER OR RUBBER LIKE ARTICLES
Filed Sept. 16, 1950     2 Sheets-Sheet 1

INVENTOR.
WALTER E. BURTON
BY
*William Cleland*
ATTORNEY

May 15, 1956  W. E. BURTON  2,745,139
METHOD AND APPARATUS FOR PRODUCING MOLDABLE
RUBBER OR RUBBER LIKE ARTICLES
Filed Sept. 16, 1950  2 Sheets-Sheet 2

INVENTOR.
WALTER E. BURTON
BY
William Cleland
ATTORNEY

United States Patent Office 2,745,139
Patented May 15, 1956

2,745,139

METHOD AND APPARATUS FOR PRODUCING MOLDABLE RUBBER OR RUBBER LIKE ARTICLES

Walter E. Burton, Akron, Ohio

Application September 16, 1950, Serial No. 185,210

9 Claims. (Cl. 18—34)

This invention relates to a method and apparatus for producing moldable rubber or rubber-like articles.

Heretofore, in order to produce rubber articles such as small rubber inserts of various kinds, bottle stoppers, and similar goods, it has been necessary first to provide relatively expensive metal cavity molds. This was not practical, as an example, where one or a small number of such articles were desired for test purposes or for use as samples before placing a new design in full scale factory production.

One object of the present invention is to provide a simple, economical method and apparatus by which molded rubber or rubber-like articles may be made for use as samples or for test purposes, as an example, to determine if a given item is marketable or if it if is of satisfactory design for its intended purpose, without substantial investment in expensive molds.

Another object of the invention is to provide a method and apparatus for making single articles of the character described, which is particularly suitable in instances where duplicates are not required or necessary, or in which the usual relatively high cost of providing a metal mold is not warranted or feasible. An example of this type of article is a rubber stamp for ink stamping specific information.

These and other objects of the invention will be manifest from the following brief description and the accompanying drawings.

Figure 1:
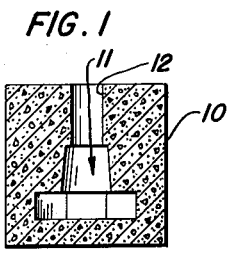
Figure 1 is a transverse cross-section through a porous cavity mold utilized in carrying out the method of the invention.
Figure 2:
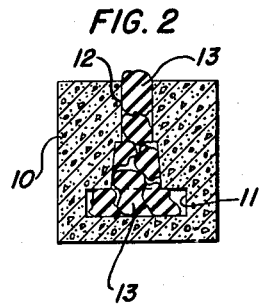
Figure 2 is a view similar to Figure 1 illustrating the mold cavity partially filled with plastic material, such as rubber, for a preliminary step in the method.

Referring particularly to Figure 1 of the drawings, there is illustrated a cavity mold 10 for practicing the improved method, and which may be formed in one piece from frangible porous material, such as plaster of Paris. The mold is provided with an article-forming cavity 11 therein, from which an inlet or access passage 12 opens outwardly. The passage 12 is relatively small in cross-section, but large enough to permit insertion of pieces 13 of vulcanizable rubber or like plastic material therethrough into the mold cavity, as shown in Figure 2. The mold 10 may be formed in known manner about a pattern (not shown) of destructible material, such as wax, which has been molded, carved or otherwise formed to given specifications corresponding to those of the desired finished article, such as a rubber cork or bottle stopper 14 shown in Figure 5. After the mold is thus formed and allowed to set about the wax pattern the same is removed as by heating the mold and pouring the resultant melted wax from opening 12.

Figure 3:
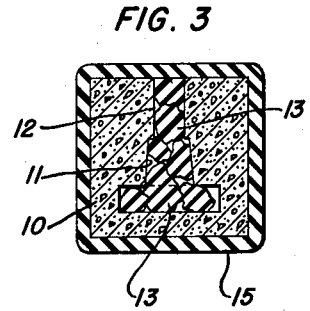
Figure 3 is a cross-section corresponding to Figures 1 and 2, illustrating the mold after it has been prepared for a subsequent vulcanizing step in the process.

After the mold 10 has been stuffed with vulcanizable rubber 13 it is coated on all sides with a substantial thickness of rubber 15, including portions thereof extending to and communicating with the inlet opening 12, substantially as shown in Figure 3. A coating 15 of vulcanizable rubber has been found satisfactory for the present purposes, but the same may be of vulcanized rubber or other plastic material which normally is incompressible in confined space and flowable under pressure.

Figure 4:
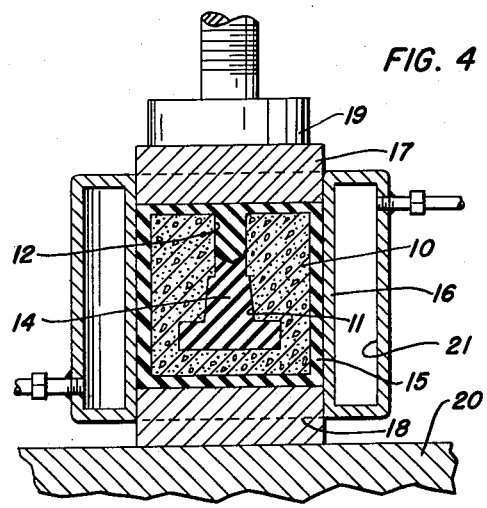
Figure 4 is a similar cross-section illustrating the prepared mold of Figure 3, contained in a vulcanizing device in which an article is molded or formed under the influence of pressure and vulcanizing heat.

As best shown in Figure 4, the rubber coated mold of Figure 3 may be inserted within a tubular sleeve 16, which is of slightly greater inside diameter than the outer diameter of the mold, between plugs 17 and 18 slidably received within the sleeve to have portions projecting freely from the ends thereof. For applying requisite pressure to the rubber coating 15, the projecting ends of the plugs are engageable between relatively movable members 19 and 20 of a suitable pressure-applying device, which for small molds may be a C-clamp applied to a table, or the movable members may be upper and lower platens of a platen press or vulcanizer (not shown). For applying vulcanizing heat to the mold the sleeve 16 may be in the form of a hollow annulus providing a chamber 21 in which steam is circulated in known manner. When a platen press is utilized, however, the vulcanizing heat may be transmitted from heated platens thereof through the plugs and the sleeve 16. Thus, pressure applied to the mold 10 as described, is effective to squeeze the rubber coating material into the inlet passage 12, thereby to compact the rubber portions 13 into the cavity 11, and forming a rubber bottle stopper 14 (see Figure 5). Any air trapped in the mold cavity when said pressure is applied will be forced into the pores of the mold material, thereby obviating formation of possible defects in the article due to air pockets.

Figure 8:
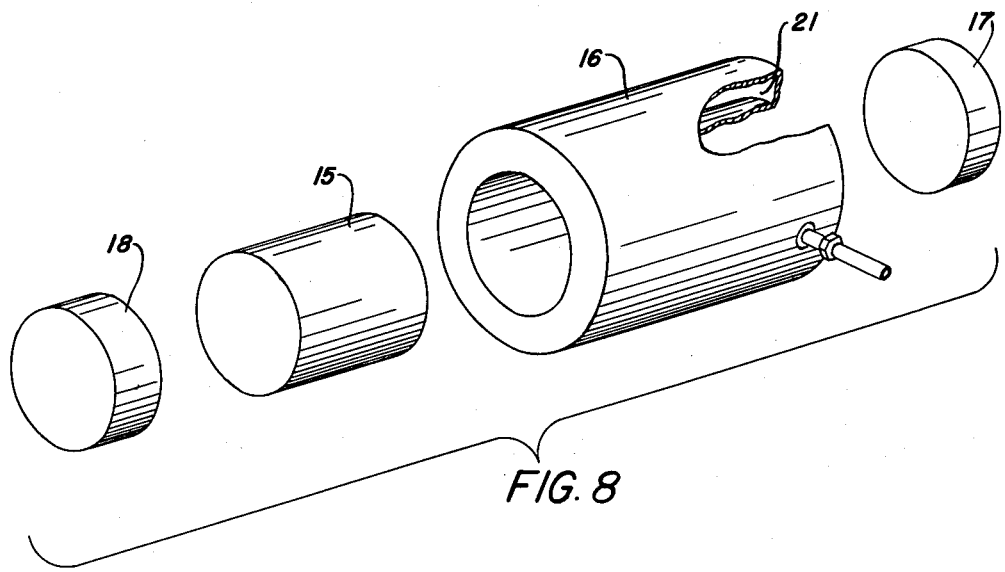
Figure 8 is a perspective explosion view of the various essential parts of the apparatus used for vulcanizing the rubber-like articles, and including the prepared mold.

After the article has been thus treated for a full vulcanizing cycle, the mold unit may be taken apart as shown in Figure 8. The article 14 is readily removable from the mold by removing the coating 15 therefrom and breaking up the mold material to expose the article. The article 14 may be cut or otherwise trimmed as desired to remove the excess rubber formed in the inlet passage 12 (see Figure 5).

Figure 5:
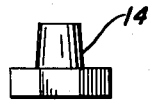
Figures 5, 6 and 7 are views illustrating three types of small rubber articles which may be produced by use of the type of apparatus shown in Figures 1 to 4, Figure 7 being partly broken away and in section.
Figure 6:
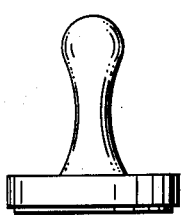
Figure 7:
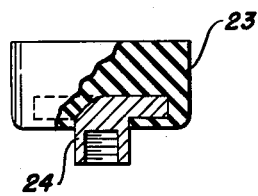

In the use of the method to produce a single sample of an article, such as the rubber bottle stopper 14 of Figure 5, or the one piece inkable rubber stamp of Figure 6, the mold 10, made as described, has pressed into the cavity 11 thereof portions 13 of vulcanizable rubber and then the mold is covered with rubber or like pliable material and placed within the steam-heated sleeve 16, opposing pressure applied to the plugs 17 and 18 inserted in the opposite ends of the sleeve, while the rubber in the mold cavity is softened by the heat from the sleeve, is effective to force a portion of the rubber coating material inwardly of passage 12 to compact the rubber 13 into a solid article in the mold cavity. This article is then easily removed from the mold by breaking the frangible mold material away from the article, as previously described. Articles 23 having metal inserts or fittings 24, as shown in Figure 7, are similarly produced by embedding the exposed or projecting portions of the insert in the mold when it is formed, so that the rubber will form about the remainder of the insert during the vulcanizing period.

If a mold of non-frangible material is used, it may be necessary to make the same in separable parts to provide for removal of the articles, with suitable means provided for holding the parts together. Also if non-porous material is used for the molds the use of one or more air-venting passages therein is contemplated to obviate air pockets when the rubber 13 is compressed in the vulcanizing step.

Figure 9:
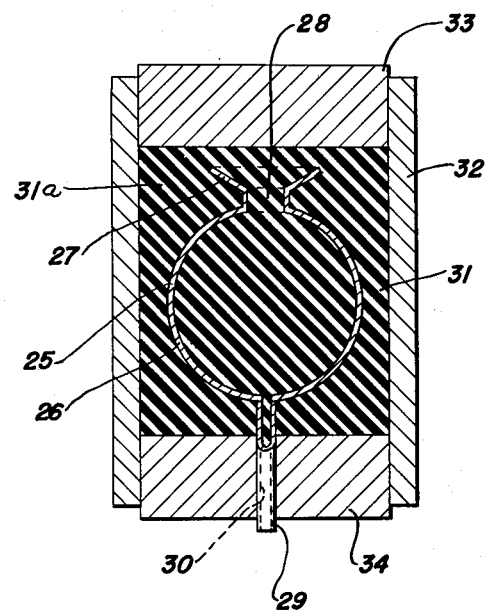
Figure 9 is a vertical cross-section, corresponding to Figure 4, and illustrating a modified form of vulcanizing equipment for practicing the method.

In Figure 9 there is shown a modified type of mold and vulcanizing equipment for practicing the process. The mold 25 may be formed of relatively rigid but destructible material, and may include a thin-walled article-forming portion 26 from which extends a funnel shaped portion 27 defining an inlet passage 28 to the mold cavity. Tubular elements 29 (one being shown) may be extended through a rubber or flowable plastic casing surrounding the mold, and through the plugs 34 to the exterior as shown, to provide an air-venting passage 30 for the above-described purposes.

As before, the mold is filled with the vulcanizable rubber or like plastic material 31, coated or surrounded with flowable plastic material, such as rubber (vulcanized or unvulcanized), or rubber-like synthetic resin material 31a and placed in a sleeve 32 between pressure plugs 33 and 34. Pressure applied to the rubber 31a by the plugs, while vulcanizing heat is applied to the equipment as before, is effective to squeeze the rubber 31a through the passageway 28 and thereby form an article in the mold. Suitable material for the mold is thin sheet metal made by electroplating a model or pattern of the desired article. For removal of the finished article the mold is broken or peeled from the same, and the article is trimmed as before, including any excess rubber that may have flowed into the venting passage 30.

It is contemplated that the mold 25 may comprise metal foil or similar pliable material which has been shaped around a pattern of an article (such as ball) and backed by suitable reinforcing or stiffening material, such as plaster of Paris.

In all forms of the invention the pressure applied to the flowable plastic material surrounding the mold, as described, is effective to equalize the pressures acting upon the mold in all directions, internally and externally. In place of rubber or other plastic flowable material as a surrounding medium for this purpose, fluids, such as water, oil, etc., may be utilized. In any event the vulcanizing pressure is regulated during the process, in such a manner that there will be no damaging pressure differentials.

Other modifications may be resorted to without departing from the spirit thereof or the scope of the appended claims.

What is claimed is:

1. A method for making articles of rubber-like elastic material, comprising the steps of providing a mold having an article-forming cavity and inlet means thereto, placing a predetermined amount of rubber-like elastic material in said cavity, encasing a substantial proportion of the mold exterior with rubber-like elastic material to have portions thereof at said inlet means in close proximity to the material in said cavity, and embracing the entire mold to apply pressure to the encasing elastic material inwardly of the mold in all directions and thereby to compress enough of the encasing elastic material inwardly of said inlet opening means to compress said predetermined amount of material into article-forming conformity with the mold cavity.

2. A method of making articles of rubber-like plastic material, comprising the steps of providing a mold having at least one article-forming cavity and inlet opening means thereto, providing a predetermined amount of said plastic material within the mold, embracing substantially the entire mold under pressure including said opening means while the mold is substantially enclosed by a flowable material which is substantially incompressible in confined space, said embracing pressure thereby compressing the enclosing material inwardly of the mold to force some of the same through said inlet opening means and thereby to compress said predetermined amount of plastic material into article-forming conformity with the mold cavity.

3. A method as set forth in claim 2, wherein said plastic material is of heat-setting characteristic and said enclosing material is a casing of elastic substance, and including the step of heating the mold to set the formed article therein.

4. A method as set forth in claim 2, wherein said plastic material is a vulcanizable elastomer and said enclosing material is a casing of elastic substance, the method including the step of heating the mold while in said embraced condition to vulcanize the formed article therein.

5. A method as set forth in claim 2, wherein said mold is of frangible porous material and said enclosing material is a casing of breakable elastic substance, the method including the step of breaking the mold and casing and removing the formed article therefrom.

6. A method as set forth in claim 2, wherein said mold is of frangible porous material and the plastic material therein is vulcanizable rubber, the method including the steps of heating the mold while in said embraced condition to vulcanize the formed article therein, and breaking the frangible mold and casing for removal of said article.

7. A mold for making articles of elastic material, comprising a one-piece mold body of frangible material and having an article-forming cavity and inlet opening means to the cavity, said mold body being encased in material which is incompressible in confined space, whereby the encased mold body is adapted to be placed under confined embracing pressure tending to squeeze the encasing material toward said inlet means and thereby pressurize the plastic material contained in the mold cavity and conform the plastic material to the shape of said cavity, said mold body being breakable for removal of the formed article therefrom.

8. A mold for making articles of elastic material, comprising a one-piece mold body having an article-forming cavity and inlet opening means to the cavity, said mold body being encased in flowable material which is incompressible in confined space, whereby the encased mold body is adapted to be placed under confined embracing pressure tending to squeeze the encasing material toward said inlet means and thereby to pressurize the plastic material contained in the mold cavity and conform the plastic material to the shape of said cavity, said mold body being of separable character capable of being stripped from the formed article together with the encasing material of the mold body.

9. A mold for making articles of elastic material, comprising a one-piece mold body of frangible porous material and having an article-forming cavity and inlet opening means to the cavity, said mold body being encased in elastic material which is incompressible in confined space, whereby the encased mold body is adapted to be placed under confined embracing pressure to squeeze the encasing material toward said inlet means and thereby pressurize the plastic material contained in the mold cavity to conform the same to the shape of said cavity, the porosity of said porous material being adapted to absorb entrapped air in the mold cavity upon application of said embracing pressure, said mold being breakable for removal of the formed article therefrom.

References Cited in the file of this patent

UNITED STATES PATENTS

| | | |
|---|---|---|
| 1,134,433 | Aylsworth et al. | Apr. 6, 1915 |
| 1,177,240 | Gates | Mar. 28, 1916 |
| 1,592,536 | O'Neill | July 13, 1926 |
| 2,072,349 | Wayne | Mar. 2, 1937 |
| 2,129,240 | Sanborn | Sept. 6, 1938 |
| 2,172,243 | Goodnow et al. | Sept. 5, 1939 |
| 2,569,195 | Quetsch et al. | Sept. 25, 1951 |